United States Patent [19]

Whitlock

[11] 4,094,270
[45] June 13, 1978

[54] FISH EGG INCUBATING DEVICE

[75] Inventor: David W. Whitlock, Bartlesville, Okla.

[73] Assignee: Federation of Fly Fishermen, El Segundo, Calif.

[21] Appl. No.: 735,001

[22] Filed: Oct. 22, 1976

[51] Int. Cl.² .................. A01K 61/00; A01K 63/00
[52] U.S. Cl. .......................................... 119/3; 220/6
[58] Field of Search .............. 119/3, 5; 220/30; 229/6, 7

[56] References Cited

U.S. PATENT DOCUMENTS

| 2,611,337 | 9/1952 | Vibert | 119/3 |
| 3,374,770 | 3/1968 | Freudenberger | 119/3 |
| 3,464,387 | 9/1969 | Martinez | 119/3 X |

Primary Examiner—Hugh R. Chamblee
Attorney, Agent, or Firm—Klarquist, Sparkman, Campbell, Leigh, Hall & Whinston

[57] ABSTRACT

Fish egg hatching device comprising perforated box with shelf to support fertilized eggs during incubation. Newly hatched fry can migrate through slots in shelf to lower fry rearing chamber in which fry may remain protected from predators until they reach free swimming stage and can then escape through slots in walls.

4 Claims, 4 Drawing Figures

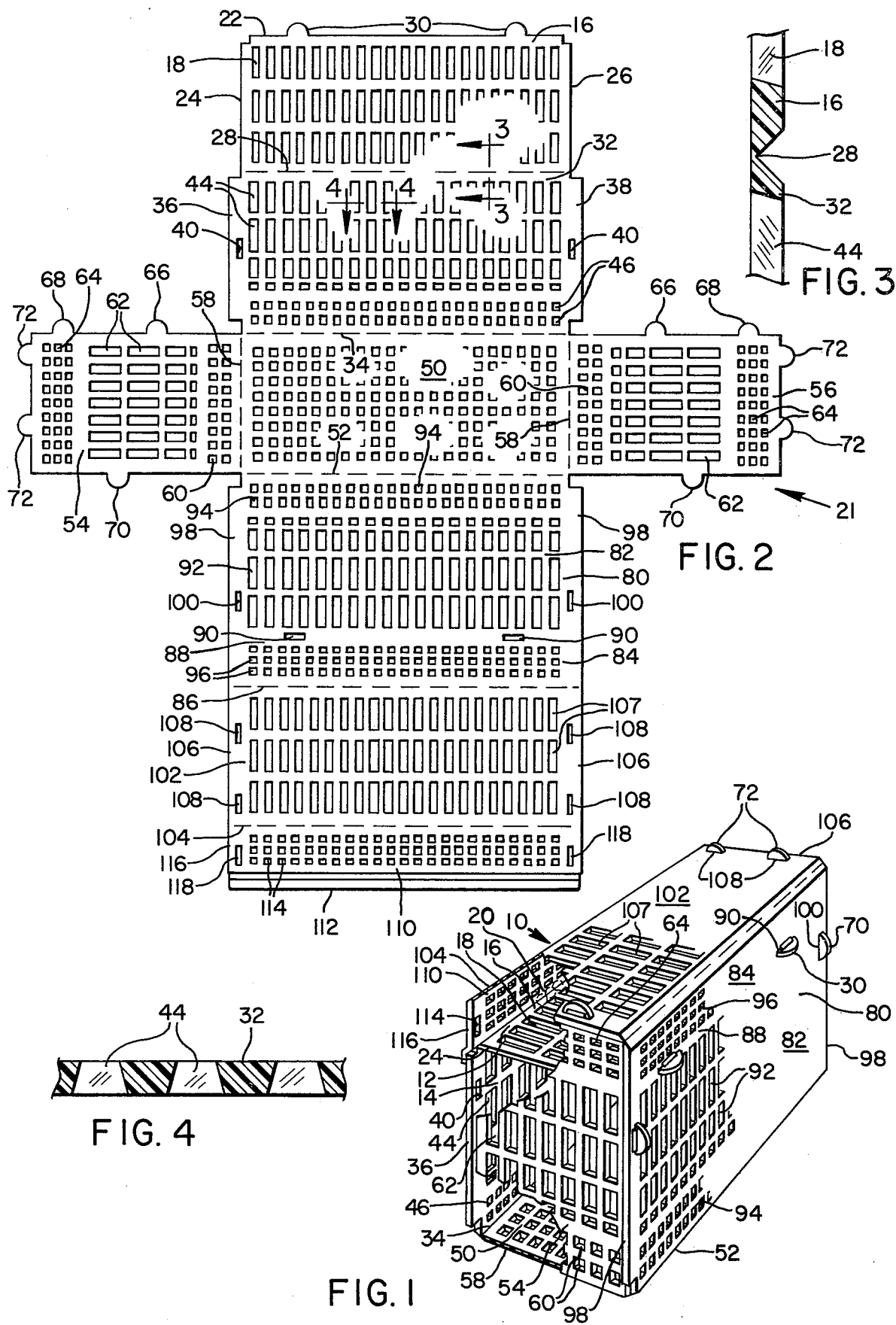

FISH EGG INCUBATING DEVICE

BACKGROUND OF THE INVENTION

To enhance the population of fish such as trout and salmon which spawn in the gravel of running streams and rivers, or in lakes where wave action causes water movement, incubating devices have been provided in which eggs may be placed and located in the gravel to afford a degree of protection to the eggs and the hatched fry from predators. An example of such a device is shown in U.S. Pat. No. 2,611,337, which also describes other prior devices. These prior devices are characterized in comprising a perforated box with a single compartment in which fertilized, eyed eggs are placed, the box then being positioned in the gravel. The emerging fry remain with the box until they become free swimming at which time they can escape through the openings in the box. However, these boxes exhibit a common deficiency in that the eggs rest on the box bottom and silt tends to deposit around the eggs which lessens the exposure of the eggs to the water as a consequence of which some eggs smother and fungus attack also occurs, although in general the fry survival rate exceeds that obtained under natural conditions.

BRIEF DESCRIPTION OF THE INVENTION

The present invention relates to an improved fish egg hatching device.

More particularly the present invention relates to a fish egg hatching device constructed and arranged to minimize the deposition of silt around the incubating eggs and also provide a nursery area separated from the incubating area in which the newly hatched fry will be protected from natural predators.

In accordance with the illustrated embodiment there is provided a fish egg hatching device comprising a box-like structure formed of plastic or other suitable material and having a perforated, horizontal dividing wall or shelf on which the eggs are retained during incubation. The shelf divides the box into an upper incubator chamber and a lower nursery chamber into which the newly hatched fry fall and in which they remain protected from predators until they absorb the yoke sac and attain a free swimming stage. All of the outer walls of the box are formed with a plurality of apertures so as to permit the flow of water through the box, the apertures having a width less than that of the eggs to be hatched in the device but at least some of those in the nursery chamber having a width greater than that of the free swimming fry so as to permit escape of the latter. The box is formed as a flat, molded blank with fold lines so that the flat blanks may be stacked for shipment and erected at the location where eggs are to be introduced.

DRAWINGS

FIG. 1 is a perspective view of the erected box partly broken away to show details thereof.

FIG. 2 is a plan view of the flat, molded blank;

FIG. 3 is an enlarged fragmentary, sectional view taken along line 3—3 of FIG. 2 showing a fold line in the blank;

FIG. 4 is an enlarged fragmentary, sectional view taken along line 4—4 of FIG. 2 showing the arrangement of the fry escape apertures.

DETAILED DESCRIPTION

Referring to the drawings and more particularly to FIG. 1, the illustrated embodiment of the invention comprises a rectangular parallelepiped box 10 having an upper egg incubating area or chamber 12 and a lower fry rearing area or chamber 14 which are separated by a horizontal dividing wall which serves as an egg shelf 16 having a plurality of slots or apertures 18 therein of such width as to retain fish eggs 20 of selected size thereon but to permit the newly hatched fry to pass through to the fry rearing chamber 14.

Referring to FIG. 2, the box 10 may be formed from a blank 21 formed of a non-toxic molded plastic such as polypropolene. The blank 21 comprises at one end thereof the portion forming the dividing wall or egg shelf 16, the same being defined by the sheet end 22, the opposite sheet edges 24, 26 of the sheet and a fold line 28 formed by a V-shaped indentation in the surface of the blank which will form the exterior surface of the box. Extending from the sheet end 22 is a pair of tabs 30, the purpose of which shall be explained subsequently. The shelf 16 is formed with a plurality of slots or apertures 18 therethrough of a width such that the eggs to be incubated will be supported thereon, but wide enough to permit newly hatched fry to fall through the shell 16 into the fry rearing chamber 14, that is, their width is less than the diameter of the eggs but greater than the smallest diameter of the newly hatched fry. By way of example, for brown trout eggs slots 13 × 3 millimeters in length will suffice.

Adjacent the egg shelf portion 16 is a portion defining the side wall 32 of the bottom, fry rearing chamber 14, the portion 32 being defined on one edge by the fold line 28 and on its opposite edge by a fold line 34. Extending from the side edges 24, 26 of the portion 32 are extensions 36, 38 respectively, each of which is provided with a tab receiving opening 40. The upper part of the side wall 32 is formed with rows of ractangular slots or apertures 44 which in width are as small as possible and still permit escape of the free swimming fry which are to be raised in the box. Preferably the apertures 44 flare in width toward the inside of the box (see FIG. 4) to facilitate escape of the fry. In a box for hatching brown trout eggs, for example, the rows 44 comprise openings 3.5 millimeters in width on the outer surface and 4.5 millimeters in width on the inner surface, with a sheet thickness of 0.075 inch. The lower portion, approximately 20 millimeters of the wall 32, is provided with rows of apertures 46 which are so dimensioned as to prevent escape of free swimming fry but still permit escape of silt. That is, the width of apertures 46 is less than the smallest dimension of the newly hatched fry. When incubating brown trout, the apertures 46 may have a largest dimension of about 2.5 millimeter, and may constitute narrow slots or a double or triple row of square openings. If absolutely flat placement of a box could be assured, the small apertures 46 may be provided only in the lower 10 or 12 millimeters of the box. Usually, however, when installed in gravel, the box is tilted and greater length of small apertures is desired so as to provide an adequate nursery area from which the immature fry cannot escape.

Next in the blank is the bottom wall forming portion 50 defined on its edge opposite the fold line 34 by a fold line 52. The bottom wall 50 is preferably formed with a grid of square apertures having maximum width to permit escape of silt and still prevent escape of fry. For brown trout such width is about 2.5 millimeters.

Extending one from each of the opposite ends of the portion 50 are end wall portions 54, 56, there being a fold line 58 along each end of the portion 50. Each of the end wall portions is formed with lower row or rows of narrow apertures 60 having a width the same as that of apertures 46. The upper portion of the end walls 54, 56 positioned in the erected box below the plane of the egg shelf 16 is provided with rows of slots 62 having substantially the same width and configuration as the rows 44. As shown in FIG. 1, the end walls 54, 56 project above the level of the egg shelf 16, this upwardly projecting portion in each being provided with a plurality of square apertures 64 having substantially the same width as the temperatures 46 so as to prevent the escape of newly hatched fry. The edges of the end wall 54, 56 adjacent the fold line 34 is formed with a pair of outwardly extending tabs 66, 68, the lower one of which, 66, is adapted to be inserted into the opening 40 in the side wall extension 38. The purpose of the tab 68 will be made clear subsequently. The opposite edge of each of the end walls 54, 56 is provided with a single tab 70 and the ends with a pair of tabs 72 whose purpose will become clear later.

Adjacent the bottom wall 50 is the other side wall 80 which includes a lower portion 82 defining the side wall for the fry rearing chamber 14 and an upper portion 84 defining the side wall for the egg incubating chamber 12. The blank is provided with a fold line 86 along what is the upper edge of the side wall 80. The portions 82, 84 are separated by an unperforated strip 88, having a pair of tab receiving slots 90 therein which receive the tabs 30 when the box is erected, as best seen in FIG. 1. The portion 82 is provided with apertures 92, 94 in the same pattern, size and distribution as the apertures 44, 46, respectively, in the side wall 32. The portion 84 is provided with a row of apertures 96 of the same size as the apertures 64 in the end walls 54, 56. The side wall 80 also has along each edge a locking tab extension 98 each of which has a tab receiving opening 100 therein in which are received the tabs 70 of the end walls when the box is erected.

Adjacent the side wall 80 in the blank is a top wall 102 having a fold line 104 along the edge thereof opposite the fold line 86. The top wall 102 is of the same width as the egg shelf 16 and bottom 50 and is formed with a plurality of rows of slots or apertures 107 having substantially the same width as the apertures 64 in the end walls 54, 56. Extending one from each of the opposite ends of the top wall 102 is a pair of tab receiving extensions 106 each of which has a pair of tab receiving openings 108 therein in which are inserted the tabs 72 of the end walls 54, 56 when the box is erected.

Finally, the blank contains an egg hatching portion side wall 100 defined by the fold line 104 and the sheet end 112. The side wall 110 is provided with a plurality of apertures 114 having the same dimensions as the apertures 64 of the end walls and also has extending one from each end a pair of locking tab receiving extensions 116 each of which has a slot 118 therein which receive the tabs 68 of the end walls 54, 56 when the box is erected.

OPERATION

The blanks 21 are adapted to be injection molded as flat bodies and to be stacked flat and shipped to the users. At that point the blanks are erected by folding up the end walls 54, 56 and thereafter folding up the side walls 32, 82 and inserting the tabs 66, 70 in the tab openings 40, 100, respectively. Next the egg shelf 16 is folded down and the tabs 30 inserted in the openings 90.

The box is then ready to receive eggs in which the embryo has formed and which can be placed in a layer on the shelf 16 whereafter the top 102 and side wall are folded into position and the tabs 72 inserted into the openings 108 and tabs 68 into the openings 118 to secure the box together. Such a box can then be transported to a stream or river under suitable refrigeration without causing injury to the eggs, or, of course, the boxes can be loaded with eggs at the streamside.

In either case, the box 10 with its eggs is adapted to be buried in a gravel bed in the stream bottom in a location such as the fish species whose eggs are contained therein would have spawned. The perforated box walls and shelf 16 permit continued flow of water through the box 10 so as to provide oxygen to the eggs and also permit any silt carried in the water to be carried on through which is highly desirable since silt accumulation about an egg can smother it. The improved circulation about the eggs also minimizes fungus attacks upon the eggs.

Newly hatched fry are not capable of free swimming although they are capable of some movement and have a specific gravity greater than one so they tend to sink. Thus, as they hatch and begin their slight movement they will fall through the apertures 18 into the fry rearing chamber 14. Here they have more room for their movements but are protected from attack from the various underwater creatures that normally prey on the relatively helpless fry. Initially the fry will occupy the lowermost part of the rearing compartment 14. The apertures 46, 60, 94 which surround this area are preferably so narrow as to prevent the escape of the fry therethrough. As the fry absorb their egg sac and reach the free swimming state they can slip through the wider apertures 44, 62, 92 of the side and end walls and make their way upwardly through the gravel into the stream. The tapered arrangement of the openings facilitate their escape.

After hatching has been completed the boxes 10 can be recovered and reused if desired.

Test plantings of 20,000 brown trout eggs in boxes as above described with about three hundred eggs per box resulted in hatches of from seventy to one hundred percent in a box with the average about ninety-five percent. The boxes were positioned in chert and limestone gravels for this test. Upon removal, none of the boxes was found to have retained any silt.

The size of the box 10, the chambers 12 and 14 and the various apertures can be changed, of course, to accommodate the box for use with various species of fish.

Having described a preferred embodiment it should be apparent to those skilled in the art that the invention permits of modification in arrangement and detail.

I claim:

1. A device for incubating spherical fish eggs and for providing a protective rearing area for fry hatched from such eggs comprising:
    a closed container having an upper egg incubating chamber, and a lower fry rearing chamber separated by a horizontal dividing wall,
    said upper portion of said container being defined by said dividing wall and a top, side and end walls, said dividing wall being provided with a plurality of apertures having a width slightly less than the diameter of said eggs but greater than the smallest dimension of the fry which hatch from said eggs, said side, end and top walls having a plurality of apertures therein of a width less than the smallest dimension of the newly hatched fry to inhibit the entrance of predators and the escape of fry whereby escaping fry will tend to move when hatched through said dividing wall aperture into said lower fry rearing chamber, said lower fry rearing chamber being defined by said dividing wall, side, bottom, and end walls, said fry rearing chamber side, bottom and end walls having a plurality of apertures therein of sufficiently narrow width to inhibit the entrance of predators, but sufficiently wide to permit the escape of the fry after absorption of the egg sac and attainment of a free swimming state.

2. A fish egg hatching device as set forth in claim 1, wherein the apertures in the bottom wall and the lower part of the side and end walls of said fry rearing chamber have a width less than the greatest dimension of said fry.

3. A fish egg hatching device as set forth in claim 1, wherein the apertures in said fry rearing chamber through which fry escape converge in the direction toward the outside of the box to facilitate the escape of fry through such apertures.

4. A foldable blank formed of molded plastic material for forming into a fish egg hatching device having an upper, egg incubator chamber and a lower, fry rearing chamber separated by a perforated horizontal dividing wall:

said blank comprising an elongate, perforated, generally rectangular plastic sheet, said dividing wall being positioned at one end of said sheet and defined by the sheet end, a first fold line extending across the sheet parallel to said one sheet end, and the opposite side edges of said sheet, a fry rearing chamber first side wall adjacent said dividing wall defined by said first fold line, a second fold line parellel to said first fold line, and the opposite side edges of said sheet, said side wall side edges each having a locking tab receiving extension thereon with a tab receiving slot therein, a fry rearing chamber bottom wall adjacent said first side wall defined by said second fold line and a third fold line parallel to said second fold line, said sheet being formed with end wall defining portions extending outwardly from each of the opposite ends of said bottom wall, there being fold lines in said sheet along each of said bottom wall ends, each of the side edges and the free end edges of said end walls having tabs extending therefrom, a second side wall defined by said third fold line, a fourth fold line extending across said sheet parallel to said third fold line and said sheet edges, the distance between said third and fourth fold lines being greater than the distance between said first and second fold lines by the height of said egg hatching chamber, said second side wall side edges each having a locking tab receiving extension thereon with a tab receiving slot therein, said second side wall also having tab receiving slots formed thereon spaced from said third fold line by the distance between said first and second fold lines, a top wall defined by said fourth fold line, a fifth fold line and said sheet side edges, said fourth and fifth fold lines being spaced apart the same distance as said second and third fold lines, said top wall side edges each having a locking tab receiving extension thereon with a tab receiving slot therein, and an egg hatching chamber side wall defined by said fifth fold line, the opposite end of said sheet, and the opposite side edges of said sheet, said egg hatching chamber side wall side edges each having a locking tab receiving extension thereon with a tab receiving portion therein.

* * * * *